(12) United States Patent  
Letas

(10) Patent No.: US 10,389,137 B2
(45) Date of Patent: Aug. 20, 2019

(54) WIND TURBINE HAVING AN EXPANDED VOLTAGE RANGE

(71) Applicant: Senvion GmbH, Hamburg (DE)

(72) Inventor: Heinz-Hermann Letas, Bovenau (DE)

(73) Assignee: SENVION GMBH, Hamburg (DE)

( * ) Notice: Subject to any disclaimer, the term of this patent is extended or adjusted under 35 U.S.C. 154(b) by 862 days.

(21) Appl. No.: 14/783,825

(22) PCT Filed: Mar. 13, 2014

(86) PCT No.: PCT/EP2014/055009
§ 371 (c)(1),
(2) Date: Oct. 9, 2015

(87) PCT Pub. No.: WO2014/166694
PCT Pub. Date: Oct. 16, 2014

(65) Prior Publication Data
US 2016/0308368 A1 Oct. 20, 2016

(30) Foreign Application Priority Data

Apr. 9, 2013 (DE) .......................... 10 2013 206 241

(51) Int. Cl.
H02J 3/38 (2006.01)
H02J 3/12 (2006.01)
(Continued)

(52) U.S. Cl.
CPC ................ H02J 3/386 (2013.01); H02J 3/12 (2013.01); H02J 3/14 (2013.01); H02J 3/16 (2013.01); Y02E 10/763 (2013.01)

(58) Field of Classification Search
None
See application file for complete search history.

(56) References Cited

U.S. PATENT DOCUMENTS

2013/0249215 A1* 9/2013 Egedal ...................... H02J 3/16
290/44

FOREIGN PATENT DOCUMENTS

CH 176137 3/1935
DE 1 282 171 11/1968
(Continued)

OTHER PUBLICATIONS

International Search Report and Written Opinion dated May 22, 2014, directed towards PCT Application No. PCT/EP2014/055009; 12 pages.

(Continued)

Primary Examiner — Jared Fureman
Assistant Examiner — David M Stables
(74) Attorney, Agent, or Firm — Morrison & Foerster LLP

(57) ABSTRACT

A wind turbine having a wind rotor, a generator powered therewith for generating electrical energy, and a connecting line for delivering the electrical energy, optionally via a system transformer. The wind turbine includes a voltage expander that expands the voltage range of the wind turbine by means of an auxiliary voltage source. The voltage expander comprises a small transformer of having a primary and a secondary winding, and a switching mechanism. The small transformer is looped into the connecting line with the secondary winding, and the switching mechanism is connected to the primary winding of the small transformer, actuating the primary winding in a switchable multi-stage manner. Thus, a multi-stage expansion of the voltage range of the wind turbine is achieved, wherein due to the arrangement of the small transformer lengthwise in the connecting line, the small transformer can have a fraction of the nominal power of the wind turbine.

28 Claims, 6 Drawing Sheets

(51) Int. Cl.
*H02J 3/14* (2006.01)
*H02J 3/16* (2006.01)

(56) References Cited

FOREIGN PATENT DOCUMENTS

| | | | |
|---|---|---|---|
| DE | 44 29 884 | 2/1996 | |
| DE | 10 2009 014 243 | 9/2010 | |
| DE | 10 2010 015 276 | 10/2011 | |
| EP | 2 219 277 | 8/2010 | |
| EP | 2 573 895 | 3/2013 | |
| EP | 2573895 A1 * | 3/2013 | ................ H02J 3/16 |
| WO | WO-2007/006565 | 1/2007 | |

OTHER PUBLICATIONS

International Preliminary Report on Patentability dated Oct. 13, 2015, directed towards PCT Application No. PCT/EP2014/055009; 10 pages.

* cited by examiner

WIND TURBINE HAVING AN EXPANDED VOLTAGE RANGE

REFERENCE TO RELATED APPLICATIONS

This application is a national stage application under 35 USC 371 of International Application No. PCT/EP2014/055009, filed Mar. 13, 2014, which claims priority to German Application No. 10 2013 206 241.9, filed Apr. 9, 2013, the entire contents of which are incorporated herein by reference.

FIELD OF THE INVENTION

The invention relates to a wind turbine comprising a wind rotor, a generator driven thereby for generating electrical energy and a connecting line for outputting the electrical energy.

BACKGROUND OF THE INVENTION

As they are becoming increasingly widespread and at the same time their performance is increasing, wind farms are preferably erected at locations at which there good wind conditions, in particular on coastlines, at sea or in mountainous regions. In many cases, these are areas with only insufficient infrastructure, which applies in particular to wind farms at sea (so-called offshore wind farms), at which there is generally no infrastructure at all yet. This necessitates comparatively long line paths to consumers or to reach high-capacity distribution networks. Therefore, there are often voltage deviations in the case of wind farms with relatively high power feeds. The grid operators have responded to this and demand a greater voltage strength with respect to deviations from the rated voltage to an increasing degree from the wind turbines, wherein this voltage strength should also be provided in the case of operation with a power factor deviating from cos phi=1.

In order to extend the voltage range of the wind turbines, it is known to provide said wind turbines with a tap-changing transformer. In this case, the transformation ratio of the transformer can be changed by means of a switch so that the wind turbine can be matched in this way to different voltages on the upstream grid. Therefore, although a comparatively large voltage range can be covered, the switching times of these on-load tap changers are comparatively long (up to in the minutes range), which is considered to be too slow. In addition, the on-load tap changers are susceptible to wear. In order to avoid this problem, in principle a solution based on semiconductor elements can be provided. However, this has the disadvantage that the semiconductor elements need to be dimensioned so as to be markedly large and are therefore elaborate since the total power is transmitted via said semiconductor elements. For modern powerful wind turbines in the megawatts range, in practice this is barely possible.

SUMMARY OF THE INVENTION

On the basis of the mentioned prior art with the on-load tap changers, an object of the invention is to expand the voltage range of a wind turbine, wherein quicker switching times are intended to be achieved with little complexity.

This can be achieved by the features as broadly described below. Advantageous developments are described in the detailed embodiments below.

In a wind turbine comprising a wind rotor, a generator driven thereby for generating electrical energy and a connecting line for outputting the electrical energy, to be precise possibly via a turbine transformer, a voltage expander is provided in accordance with the invention which expands the voltage range of the wind turbine by means of an additional voltage source, wherein the voltage expander comprises a dedicated small transformer having a primary and a secondary winding and a switching mechanism, and wherein the small transformer is looped in with the secondary winding in the connecting line, and the switching mechanism is connected to the primary winding of the small transformer and actuates said primary winding with the capacity for switchover in multi-tap fashion.

The invention is based on the concept of bringing about an expansion of the voltage range in which the wind turbine can be operated by means of a voltage expander consisting of an additional small transformer with a switching mechanism. By means of the switching mechanism, the small transformer is in this case connected in multi-tap fashion, wherein, depending on the tap changing, a more or less large or directionally different voltage shift is achieved. Since the small transformer in accordance with the invention is looped into the connecting line between the wind turbine and the grid, it can in this way increase the voltage of the wind turbine by virtue of it inducing an additional voltage with the same mathematical sign as the voltage output by the wind turbine or it can decrease the voltage of the wind turbine by virtue of it inducing a voltage with the opposite mathematical sign to the wind turbine.

A particular highlight of the invention consists in that, thanks to its arrangement longitudinally in the connecting line, a transformer whose power can be dimensioned so as to be markedly less than the power of the wind turbine is sufficient. The transformer is therefore referred to as "small transformer". The rated size of this small transformer is merely dependent on the desired voltage step of the voltage expander. If, for example, an expansion of 10% in relation to the rated value is sufficient, the small transformer also only needs to have a power of the order of approximately 10% of the rated power of the wind turbine. With the arrangement according to the invention, therefore, not only a multi-tap and therefore matched expansion of the voltage range of the wind turbine results but this is also successful in an astonishingly undemanding manner, namely using a voltage expander whose small transformer only needs to have a fraction of the rated power of the wind turbine. Thus, a considerable expansion of the voltage range of the wind turbine can be achieved with very little additional complexity.

Some terminology will be explained below:

A small transformer is understood to mean an additional transformer with an internal power supply which is looped into the connecting line between the wind turbine and the turbine transformer thereof, on the one hand, and a grid connection point in the wind turbine, on the other hand.

The grid connection point may be a connection point of the wind turbine to a farm-internal grid or a transfer point to a superordinate energy transmission grid.

Multi-tap is understood to mean both unipolar and bipolar tap changing. This means that multi-tap can include both tap changing in the sense of 1, 2, 3, . . . and tap changing in the sense of −1, 0, +1.

It is particularly preferred if the multi-tap actuation takes place with different polarization. This provides the possibility of expanding not only the voltage range of the wind turbine by means of the voltage expander upwards to relatively high voltages, but also downwards to relatively low voltages. Expediently, a zero tap is also provided.

In order to achieve a relatively large adjustment range for the voltage expander, preferably a plurality of small transformers are arranged in series in the connecting line. Therefore, corresponding to the number of small transformers, a relatively large number of taps can be provided, with the result that matching of the voltage range by means of the voltage expander can take place over a relatively large range, on the one hand, but also finer graduations and therefore matching to the respective conditions are possible, on the other hand. In this case, the small transformers can each be configured identically, with the result that they each generate the same additional voltage. Then, only one type of small transformers and possibly switching mechanisms is required, which simplifies the storage and production. In order that said small transformers can be switched randomly, in each case a dedicated switching mechanism is preferably provided for the small transformers. Particularly advantageously, the switching mechanisms are embodied in such a way that they have power contactors and/or thyristors as switching elements. Robust switching can thus be achieved which is also quick at the same time, preferably within a switching time range of at most 0.1 s. However, the possibility of the small transformers being configured with different sizes so that they generate different levels of voltages should not be ruled out. In this case, an even greater voltage range can be covered by a combination; for example, in the case of the arrangement of three small transformers in the sense of 1:2:4, eight different voltage steps of 0-7 can be provided for the voltage expander.

A small transformer in accordance with the present invention is characterized by the fact that it is merely dimensioned for a power which is much lower than the rated power of the wind turbine. For the reasons already mentioned, this is entirely sufficient for the voltage expander to be able to achieve a corresponding extension of the voltage range of the wind turbine. High costs or unnecessary requirements in respect of installation space owing to overdimensioning are thus avoided. Preferably, the small transformer has a power which is at most ¼ of the rated power of the wind turbine. With such a small design for the small transformer in accordance with the invention, not only is a considerable cost saving made, but also the requirement for installation space and cooling of the small transformer is thus minimized. The voltage expander according to the invention therefore manages with a minimum of additional complexity, to be precise both in respect of costs and requirements in terms of installation space. Therefore, the voltage expander according to the invention is particularly also suitable for use in retrofitting existing wind turbines or wind farms, and this is of significant importance in respect of the numerous wind farms already in existence. In the invention, a design for the power of the small transformer depending on the additional voltage to be provided by the voltage expander has proven successful. Preferably, the power of the small transformer is dimensioned proportionally to the additional voltage, wherein the additional voltage is based on the rated voltage. Thus, for example, in order to achieve an additional voltage of the order of one tenth of the rated voltage, expediently the power of the small transformer is designed for at most a tenth of the rated power of the wind turbine. This means that, for a wind turbine with a rated power of 3 MW, only one transformer which is designed for no more than a power of 0.3 MW is required.

Expediently, the voltage expander is designed in such a way that it and its small transformer are disconnectable from the connecting line via switching contactors. It is therefore possible to achieve a situation whereby when the voltage expander is not required at voltages in the region around the rated voltage during normal operation, the voltage expander is inactive and therefore losses are reduced, in particular transmission losses owing to the small transformer. Although these losses are in any case only low owing to the already small dimensioning of the small transformer in accordance with the invention, an avoidance of these low losses also means an increase in efficiency of the wind turbine.

In order to avoid, in the case of multi-tap actuation of the small transformer of the voltage expander in accordance with the invention, a situation in which the small transformer becomes load-free during switchover, whether this be only instantaneously, a separate load tap is preferably provided. It ensures that, even during switchover, a load is always connected to the small transformer. Therefore, the risk of impermissibly high voltage peaks during switchover is counteracted.

The voltage expander is expediently configured in such a way that the small transformer is installed in such a way that it is combined with the turbine transformer. Preferably, in this case the small transformer is still in the form of a dedicated (possibly replaceable) component, whose electrical connection is looped into the turbine transformer. Particularly preferred is a design in which the additional voltage source formed by the small transformer is connected to the turbine transformer on the high-voltage side. Preferably, this takes place at the medium-voltage level, to be precise in such a way that the small transformer is connected within a medium-voltage winding of the turbine transformer. As an alternative, provision can also be made for the small transformer to be connected to a neutral point of the turbine transformer on the medium-voltage side. Both embodiments provide the advantage that the small transformer is combined with the medium-voltage side. This not only saves on installation space, but also means effective short-circuit protection of the small transformer without any further structural measures since the short-circuit protection is already effected by the medium-voltage winding of the turbine transformer.

A preferred embodiment of the small transformer is a high-leakage-reactance transformer, which has a short-circuit voltage uk of at least 0.10, preferably of at least 0.15. In this case, it is advantageous if the primary winding of the small transformer is wound over the secondary winding. It has proven to be particularly successful to provide the high-leakage-reactance transformer with pancake coils, which are preferably arranged on remote limbs of a transformer core in particular of the turbine transformer and/or are in the form of webs in the transformer core. Preferably, magnetic steel sheets with a hard saturation characteristic are used for the core. In addition, the coils are expediently arranged in such a way that they do not form an air-core transformer. Undesired magnetic coupling is thus avoided.

Expediently provision is made for the switching mechanism of the voltage expander to be actuated depending on the voltage and/or wattless power. It has proven to be particularly successful if the switching mechanism is actuated depending on both parameters. Preferably a regulator for the voltage and/or wattless power is provided for this purpose, which regulator detects, as controlled variable, the voltage and/or the wattless power in the connecting line. Advantageously, this detection takes place on a side remote from the wind turbine, i.e. a grid-side side, in relation to the voltage expander according to the invention. Thus, a high degree of accuracy in the setting of the desired expanded voltage range is achieved. In order to avoid undesired interactions between the switching mechanism of the voltage expander according to the invention and existing voltage regulation devices, in particular of the wind turbine as such or of a wind farm, provision is expediently made for a switching state of the switching mechanism of the voltage expander to be applied to such an existing regulation, to be precise in particular to disturbance variable feedforward control. This means that the regulator is already preset in the case of the actuation of the switching mechanism to a thus changed voltage level and therefore no longer needs to be adjusted. The risk of the already existing regulator operating in opposition to the voltage range expansion by means of the voltage expander according to the invention is thus counteracted.

In addition, the invention extends to a wind farm comprising a plurality of wind turbines, which are connected to a farm grid, which in turn is connected to a transmission grid via a coupling line, wherein in accordance with the invention, a central voltage expander is provided, which ensures the expansion of the voltage range of the wind farm as a whole by means of an additional voltage source and a switching mechanism, as described above. Expediently, a farm regulator for the voltage and/or wattless power is provided for this purpose, which farm regulator detects as controlled variable, the voltage or wattless power in the coupling line, and adjusts said voltage or wattless power by means of the central voltage expander. Preferably, this detection is performed on that side of the voltage expander which is remote from the farm, i.e. on the side toward the transmission grid. For a more detailed description and for the configuration of advantageous developments, reference is made to the above description, which applies accordingly.

Preferably, a switching state of the switching mechanism of the central voltage expander is applied to disturbance variable feedforward control of the farm regulator. Therefore, a smooth switching behavior is achieved, with the result that already existing voltage regulation of the wind farm interacts in harmony with the central voltage expander according to the invention.

Preferably, the wind farm has one or more wind turbines, which have a voltage expander, as described above. Thus, the voltage range and the adjustment range are further optimized.

BRIEF DESCRIPTION OF THE DRAWINGS

The invention will be explained in more detail below with reference to the attached drawing and illustrated in the advantageous exemplary embodiments of the invention. In the drawing.

DETAILED DESCRIPTION OF THE INVENTION

Figure 1:
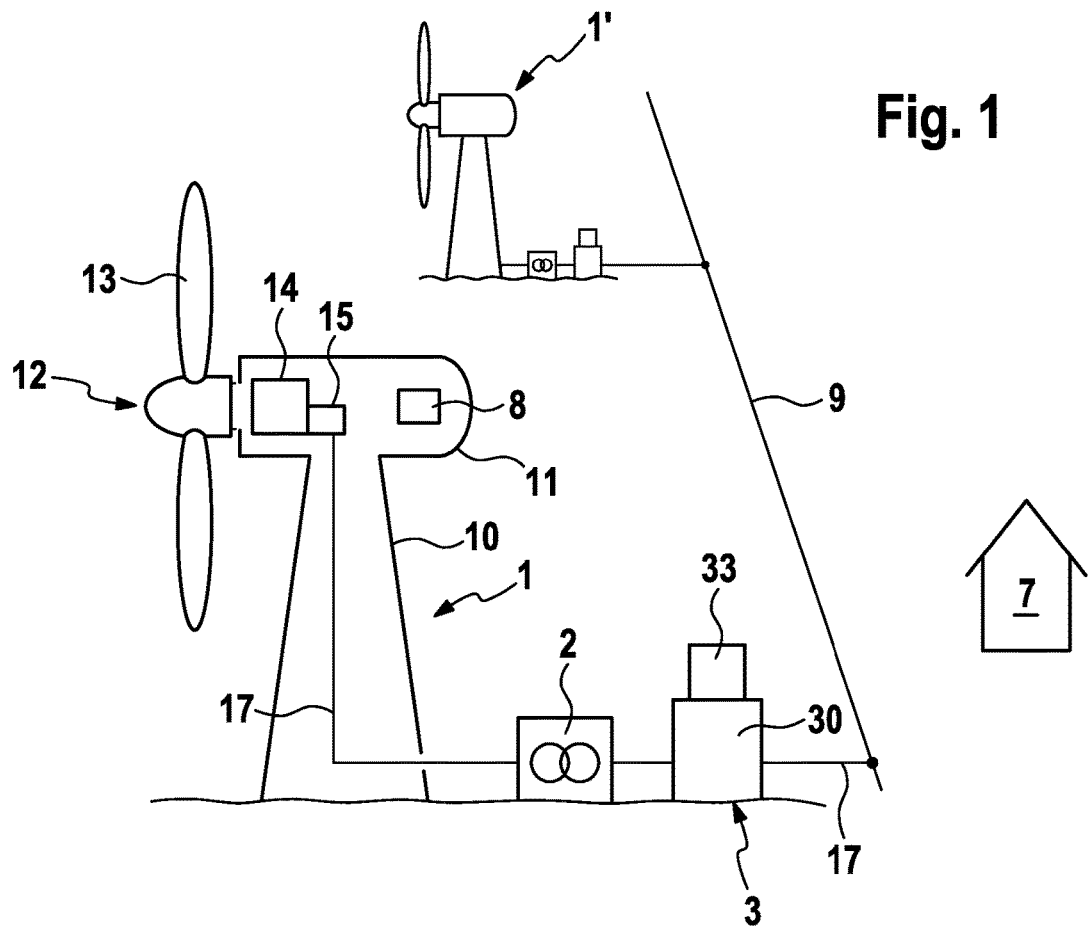
FIG. 1 shows an exemplary embodiment of a wind turbine in accordance with the invention.

The wind turbine illustrated in FIG. 1 and provided overall with the reference numeral 1 comprises a nacelle 11 arranged on a tower 10 pivotably in the azimuthal direction at the upper end of the tower 10. The nacelle 11 has a rotatably mounted wind rotor 12 having rotor blades 13 on one of the end sides of said nacelle. Said wind rotor drives, via a shaft (not illustrated), a generator 14 comprising a converter 15 for generating electrical energy, which is output via a line 17 with a turbine transformer 2 of the wind turbine to a farm-internal grid. The operation of the wind turbine 1 is monitored by a control system 8, which is arranged in the nacelle 11. Said control system is connected to a farm master 7 and/or to superordinate control devices (not illustrated), in particular the grid operator, via communications lines (not illustrated).

The wind turbine 1 outputs the electrical energy on a low-voltage level, which is typically in the range of 600-1000 V. For the transmission, and this also applies already for the transmission over the farm-internal grid 9, relatively high voltages are generally required, however, namely those in the medium-voltage range, for example 20 kV.

For this purpose, the turbine transformer 2 is provided on or in the wind turbine 1. The voltage on the farm-internal grid 9 can fluctuate, and the wind turbine 1 has to follow the voltage fluctuation correspondingly via its transformer 2. Furthermore, it is necessary for the wind turbine to provide wattless power on request, whether this be inductive or capacitive wattless power. In principle, known wind turbines 1 can provide this, but not always over the entire required voltage range. In order to expand the voltage range which is useable for the wind turbine 1, a voltage expander 3 is looped into the connecting line 17 connecting the wind turbine 1 to the grid 9 in accordance with the invention. In the exemplary embodiment illustrated in FIG. 1, said voltage expander is located on the medium-voltage side of the transformer 2, i.e. between the transformer 2 and the grid 9. However, it could just as well also be arranged on the low-voltage side of the transformer 2, i.e. between the wind turbine 1 and the transformer 2. The voltage range of the expander 3 serves the purpose of expanding the voltage range of the wind turbine 1 on the grid 9 in order thus to also meet more stringent requirements from the grid operators in respect of the ability of the wind turbines to withstand voltage fluctuations whilst at the same time provide wattless power.

Figure 2:
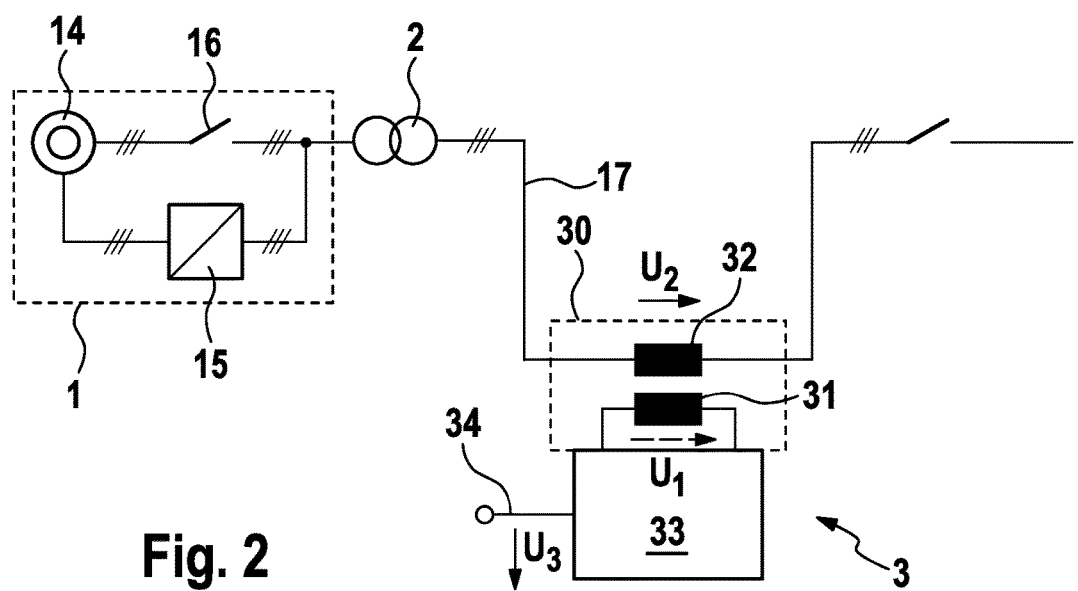
FIG. 2 shows a circuit view for the wind turbine illustrated in FIG. 1 with a voltage expander.

The voltage expander 3 comprises a small transformer 30 having a primary winding 31 and a secondary winding 32 and a switching mechanism 33. The secondary winding 32 is looped into the connecting line 17 between the wind turbine 1 and the grid 9, to be precise on the grid side, i.e. on the medium-voltage level, in the exemplary embodiment illustrated in FIGS. 1 and 2, as already mentioned above. The primary winding 31 is connected to the switching mechanism 33, and electrical energy is supplied to said primary winding by the switching mechanism, which electrical energy is supplied to the switching mechanism 33 via a connection 34. The power supply to the connection 34 can in turn take place from the grid 9, from the wind turbine 1 itself or else from any other desired source, wherein this source then needs to be matched with respect to its frequency and phase angle with respect to the voltage on the grid.

The design and mode of operation of the switching mechanism will be explained in more detail with reference to the exemplary embodiment illustrated in FIG. 3. Said figure shows a switching mechanism 33 which switches using three taps, namely the switching taps MINUS, ZERO and PLUS. At the switching tap PLUS, an additional voltage for the small transformer 3 is connected by the voltage expander 3 so that the total voltage of the wind turbine 1 is increased. Conversely, in the MINUS position, the voltage output by the wind turbine 1 is reduced by a corresponding magnitude. In the ZERO setting, there is no change. The magnitude of the voltage U2 additionally applied by the small transformer 30 is determined by the transformation ratio between the primary coil 31 and the secondary coil 32. A voltage U1 is applied to the primary coil 31 by the switching mechanism 33, which in turn draws its electrical energy from a supply transformer 4 which is connected to its supply connection 34, with a voltage U3 being fed in turn to said supply transformer 4 by the wind turbine 1 itself via the supply line 17 (the feed is not illustrated in FIG. 3 for reasons of clarity).

In order to actuate the primary winding 31 at the three different taps MINUS, ZERO and PLUS, pairs of switches 35, 36 and 35', 36' and 37 are provided. For the tap PLUS, the pair of switches 35, 36 turns on, while the pair of switches 35', 36' and the switch 37 are open. In this case, the voltage U3 applied to the supply connection 34 is output from the switching mechanism 33 to the primary winding 31 with the same polarity. Depending on the transformation ratio between the primary winding 31 and the secondary winding 32, the small transformer 30 feeds an additional voltage U2 into the connecting line 17 correspondingly. At the tap for MINUS, the pair of switches 35', 36' is closed, while the pair of switches 35, 36 and the switch 37 are open. In this case, the supply voltage U3 applied unchanged to the supply connection 34 is output to the primary winding 31 with the reverse polarity (−U1). Accordingly, the small transformer feeds a voltage −U2 into the connecting line 17 at the secondary winding 32 of said small transformer. In the ZERO position, the switch 37 is closed, while the pairs of switches 35, 36 and 35', 36' are open. The primary winding 31 is thus short-circuited via the switch 37. This means that the switching mechanism 33 does not apply any voltage to the primary winding 31. Accordingly, the small transformer 30 also does not feed any voltage additionally to the supply line 17. Thus, depending on the position of the switches in the switching mechanism 33 and the small transformer 30, either a positive voltage +U2, a negative voltage −U2 or even no voltage (U=0) is fed into the connecting line 17 of the wind turbine additionally from the small transformer 30. Correspondingly, depending on the switch position, the voltage range can be extended, decreased or kept constant.

In order to ensure that the primary winding 31 is always provided with a load even during switchover of the taps, a load tap 5 is actuated. The load tap 5 comprises an actuating switch 50 and a load resistor 51. During switchover of the taps, before the switch pairs 35, 36 and 35', 36' or the switch 37 are actuated, the actuating switch 50 is closed and therefore the resistor 51 is connected to the primary winding 31 as load. The pairs of switches 35, 36 and 35', 36' or the switch 37 can then be actuated without the primary winding 31 becoming load-free or the circuit thereof being interrupted. Once the new switching state of the switching mechanism 33 has been reached, the actuating switch 50 is opened again and therefore the load resistor 51 is decoupled.

Figure 3:
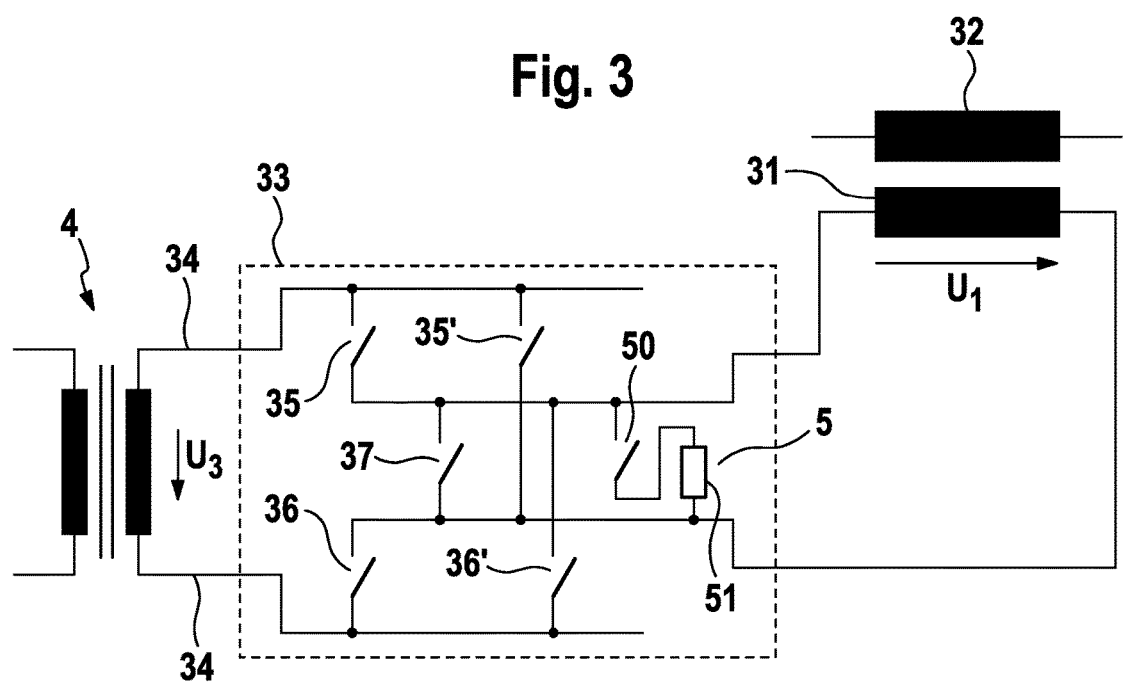
FIG. 3 shows a detail illustration of a switching mechanism of the voltage expander.
Figure 4:
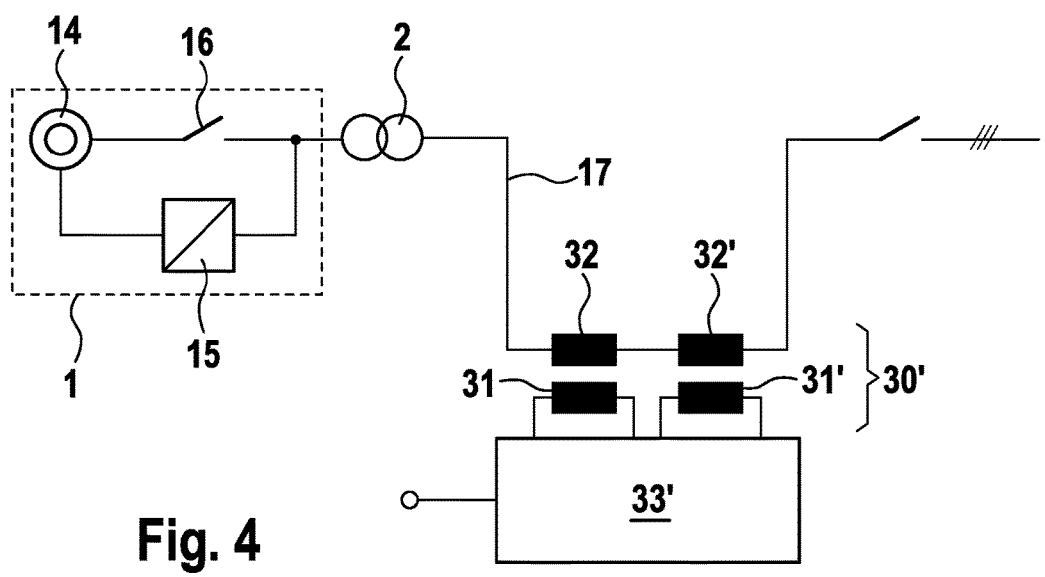
FIG. 4 shows a circuit in accordance with a second exemplary embodiment of the invention with a two-tap voltage expander.

FIG. 4 shows a further exemplary embodiment which differs substantially from that illustrated in FIG. 3 in that a small transformer 30' is provided with a second pair of primary and secondary coils 31', 32'. The switching mechanism 33' is likewise modified correspondingly. Thus, the additional voltage added by the voltage expander 3 can be varied in 5 steps. This enables a relatively coarse or relatively fine adjustment.

Figure 5:
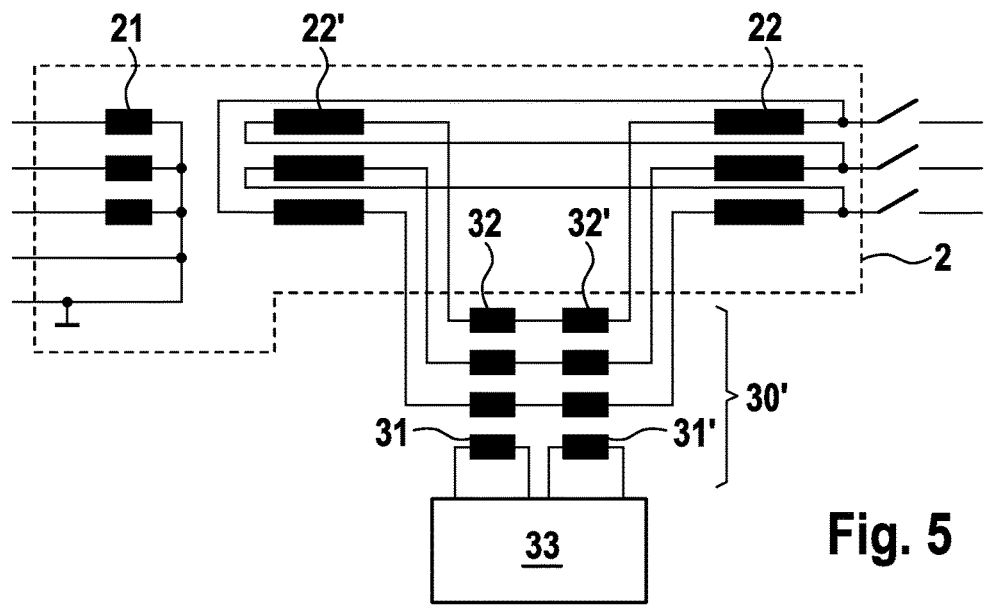
FIG. 5 shows an exemplary embodiment of a turbine transformer comprising a small transformer of the voltage expander in a combined design.

In the exemplary embodiments previously illustrated, the small transformer 30, 30' of the voltage expander is in the form of a separate element. However, this is not necessary. It may be expedient to integrate the small transformer in the turbine transformer 2 of the wind turbine 1. A first exemplary embodiment of this is illustrated in FIG. 5 using a three-phase diagram. The transformer 2 has the switching group Dyn5. The primary windings 21 to which the wind turbine 1 is connected are arranged in the left-hand half of the diagram. The secondary windings are arranged in the center or in the right-hand region, wherein the secondary windings are formed in two parts, namely the two parts 22, 22'. In each phase, two secondary coils 32, 32' of the small transformer 30' of the voltage expander are arranged in the region between the two parts 22, 22' of the secondary windings. This results not only in a more compact design, but at the same time also a higher level of intrinsic safety of the small transformer is achieved. This is because short-circuit currents in the case of external faults are limited by the impedances of the secondary windings 22, 22' present on both sides.

Figure 6:
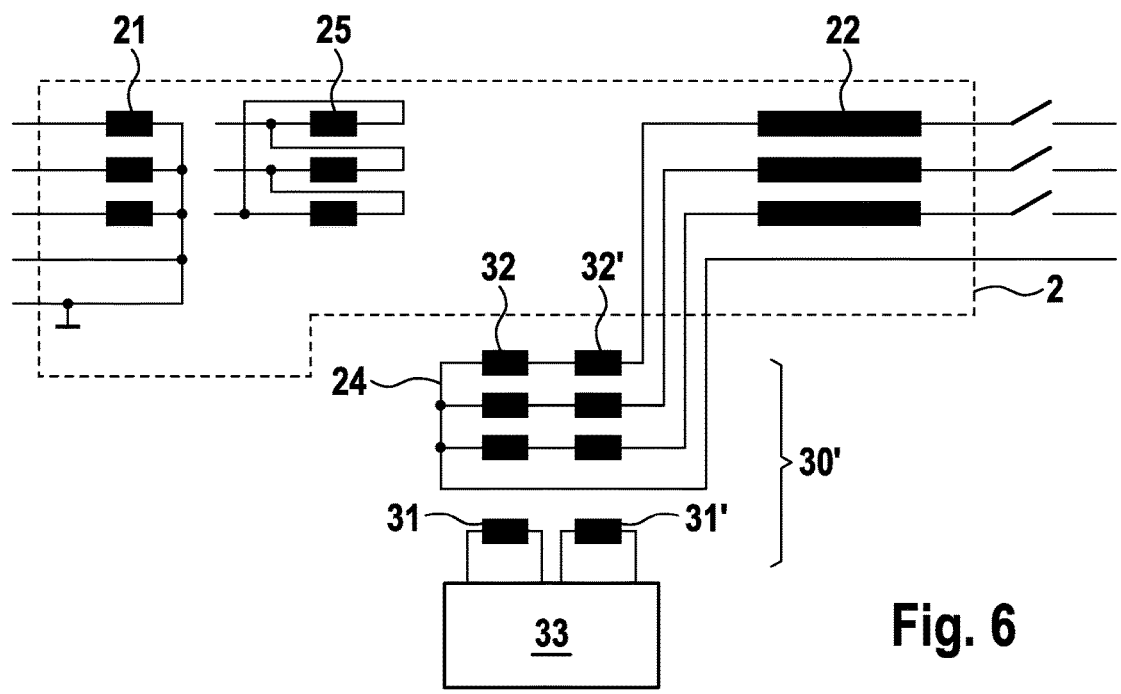
FIG. 6 shows a further exemplary embodiment of the turbine transformer with another arrangement of the small transformer at the medium-voltage level.

A further alternative exemplary embodiment is illustrated in FIG. 6 using a transformer in the switching group YNd7yn0. The transformer has a primary winding 21 for each phase on the low-voltage side illustrated on the left-hand side. On the medium-voltage side illustrated on the right in the center, the transformer likewise has a secondary winding 22 for each phase, which secondary windings are combined via a neutral point 24. In each phase, two secondary coils 32, 32' of the small transformer 30' are arranged between the secondary coils 22 and the neutral point 24. In addition, the transformer has a compensating winding 25. In the same way as in the exemplary embodiment illustrated in FIG. 5, in this exemplary embodiment integration of the secondary coils 22, 22' of the small transformer 30' in the turbine transformer 2 is achieved. Short-circuit protection for the small transformer thanks to the impedances of the turbine transformer 2 is likewise provided.

Figure 7:
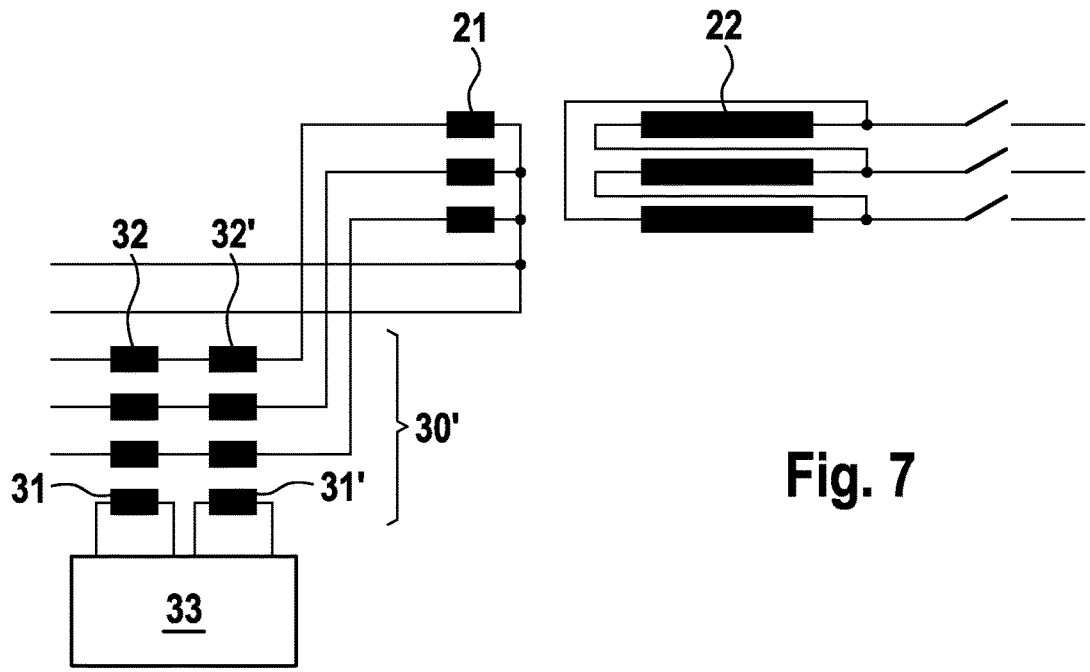
FIG. 7 shows a further exemplary embodiment with an arrangement of the small transformer on a low-voltage level of the turbine transformer.
Figure 8:
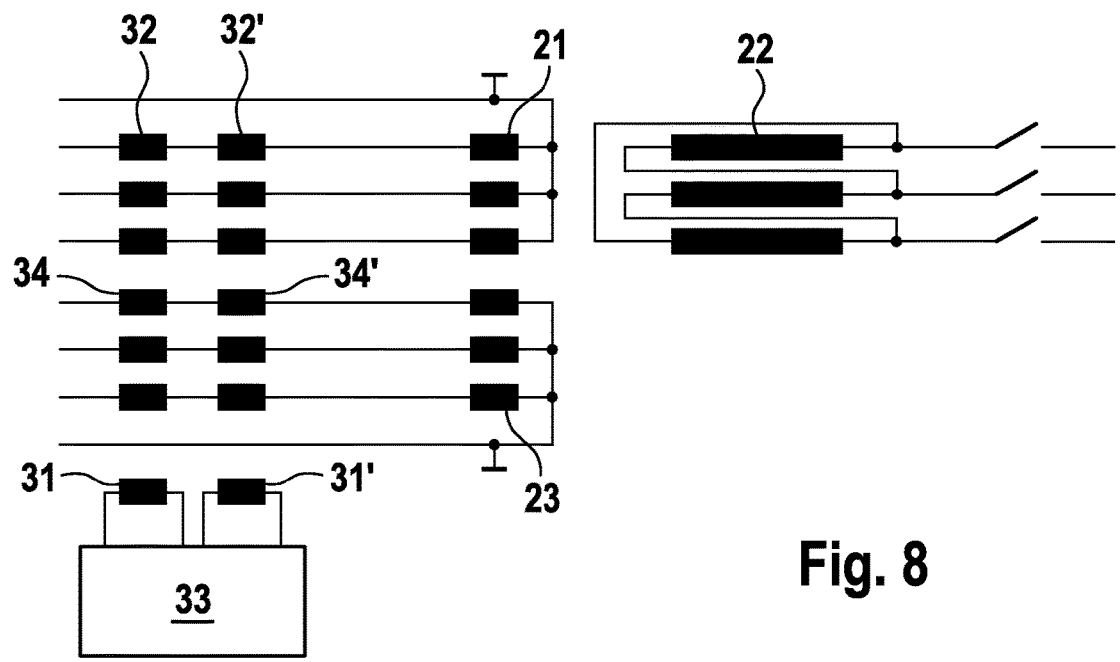
FIG. 8 shows a further exemplary embodiment with another arrangement of the small transformer on the low-voltage side of the turbine transformer.

FIG. 7 shows an alternative circuit concept, again using the example of a transformer of the switching group Dyn5. In this case, the small transformer 30' is connected on the low-voltage side (illustrated on the left-hand side in the figure). The transformer has primary windings 21 on the low-voltage side and secondary windings 22 on the medium-voltage side. In each phase, two secondary windings 32, 32' of the small transformer 30' are arranged between the primary windings 21 and the wind turbine 1 feeding said primary windings. This exemplary embodiment comprising a two-winding transformer having a primary winding and a secondary winding for each phase can be extended to give a three-winding transformer having two primary windings and one secondary winding for each phase. Such an exemplary embodiment comprising a transformer of the switching group Dyn5yn5 is illustrated in FIG. 8. In this case, two sets of primary windings 21, 23 are provided, which are at different voltage levels of 660V and 950V, for example. This makes it possible to operate the stator of the generator 14 of the wind turbine 1, which stator transmits a large portion of the power, at a higher voltage level than the rotor of the generator 14, which transmits only a relatively small proportion of the power. Since a dedicated set of secondary coils 32, 32' and 34, 34' of the small transformer 30' are provided both for the primary winding 21 and for the additional primary winding 23, in this embodiment the expansion of the voltage range in accordance with the invention can therefore also be achieved.

Figure 9:
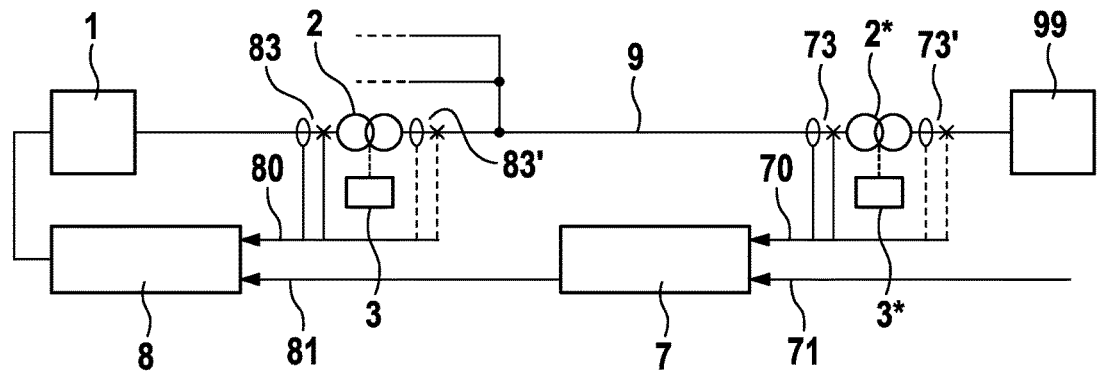
FIG. 9 shows a diagram showing the regulation structure in a wind farm comprising wind turbines in accordance with the invention.
Figure 10:
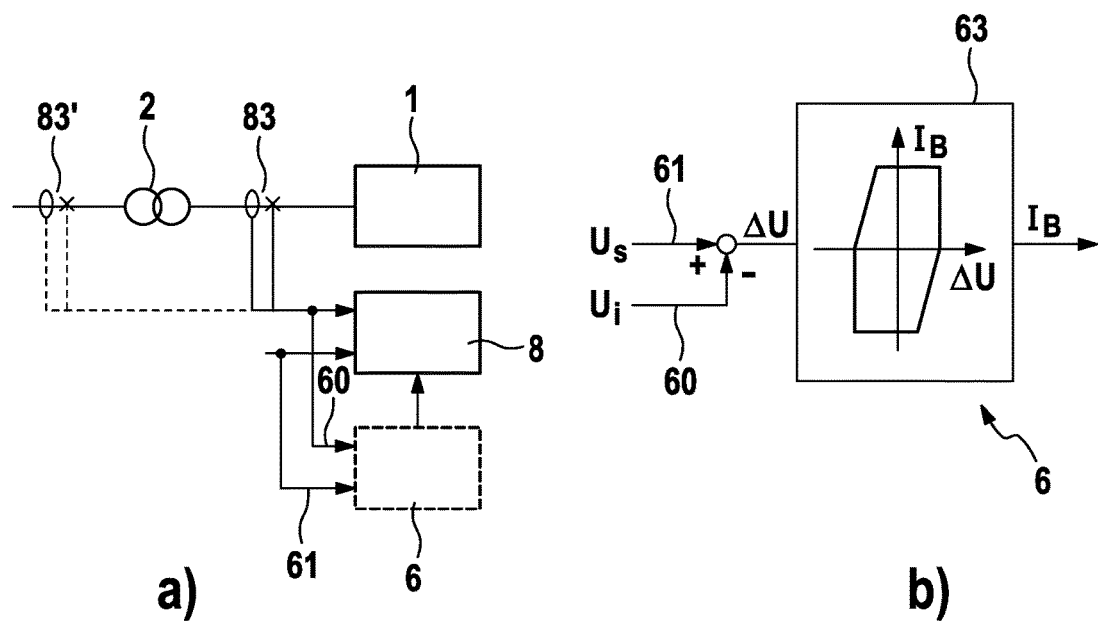
FIG. 10 shows details relating to the control for a facility as shown in FIG. 9.

The interaction of the voltage expander 3, on the one hand, and voltage regulation in a wind farm comprising a plurality of wind turbines 1, on the other hand, is illustrated in FIG. 9. The figure shows, on the left-hand side, the wind turbine 1, which outputs electric power via its turbine transformer 2 with the voltage expander 3 arranged thereon onto a farm-internal grid 9, to which further wind turbines (not illustrated in FIG. 9) are connected. The farm-internal grid 9 is furthermore connected to a high-voltage transformer 2\* for outputting electric power to a wide-area transmission grid 99. A voltage expander 3\* is likewise provided for the high-voltage transformer 2\*.

Voltage regulation which is part of the control system 8 of the wind turbine can be provided for each of the wind turbines. This voltage regulation comprises an input 80 for actual values of the voltage and an input 81 for corresponding setpoint values. The actual values are detected by means of sensors 83 for voltage and current. They are arranged on the low-voltage side of the turbine transformer 2 in the exemplary embodiment illustrated. As an alternative, provision can also be made, however, for said sensors to be arranged on the medium-voltage side of the turbine transformer 2 as sensors 83'.

In addition, the wind farm has voltage regulation for the entire wind farm in the farm master 7 of said wind farm. This voltage regulation likewise has two inputs, one input 70 for actual values and one input 71 for setpoint values. The actual values for voltage and current in the wind farm are detected by means of sensors for voltage and current 73, which are arranged on the medium-voltage side of the high-voltage transformer 2\*. As an alternative, provision can also be made for sensors 73' to be arranged on the high-voltage side of the high-voltage transformer 2\* instead.

In the event of fluctuations in the voltage on the transmission grid 99 or on the farm-internal grid 9, corresponding fluctuations on the respective other side of the transformers 2, 2\* result. Since a voltage expander 3 is arranged on the turbine transformer 2 and a further, central voltage expander 3\* is arranged on the high-voltage transformer 2\* as well, the voltage on the respective primary side of the transformers 2, 2\* additionally also changes when the voltage expander 3 connected to the turbine transformer 2 or the central voltage expander 3\* connected to the farm transformer 2\* are actuated. This is because in this case the voltage additionally applied by said voltage expanders is changed stepwise. This results in sudden changes in the case of the sensors 73, 83 arranged on the primary side. These changes would be identified by the voltage regulation 7, 8 and attempts would be made to correct said changes. However, this is undesirable since the connection of the voltage took place by means of the voltage expanders 3, 3\* in order to expand the voltage range. This should not be counteracted by a corresponding counter measure formed by the integrated voltage regulation 7 of the wind turbine or the wind farm.

In order to avoid this, expediently feedforward control is implemented, to be precise in the form of a disturbance variable compensation unit 6. Signals for the actual values and for the setpoint values are applied both to the disturbance variable compensation unit 6 and to the voltage regulation 8 to corresponding inputs 60, 61. From these signals, a correction value is determined by means of the disturbance variable compensation unit 6, said correction value being applied to an input for disturbance variable compensation 86 of the regulator 8. The disturbance variable compensation unit 6 preferably has a differentiating element 62, which determines a voltage deviation between the actual voltage at the input 60 and the setpoint voltage at the input 61. The resultant differential voltage value $\Delta U$ is applied to a characteristic element 63, which determines a value for a reactive current to be set depending on a provided operating range 18 of the wind turbine depending on the voltage deviation. This value is output by the characteristic module 63 and applied to the input for disturbance variable compensation 86 of the voltage regulator 8 of the wind turbine 1. A corresponding circuit can be provided for the voltage regulator 7 of the farm master.

Figure 11:
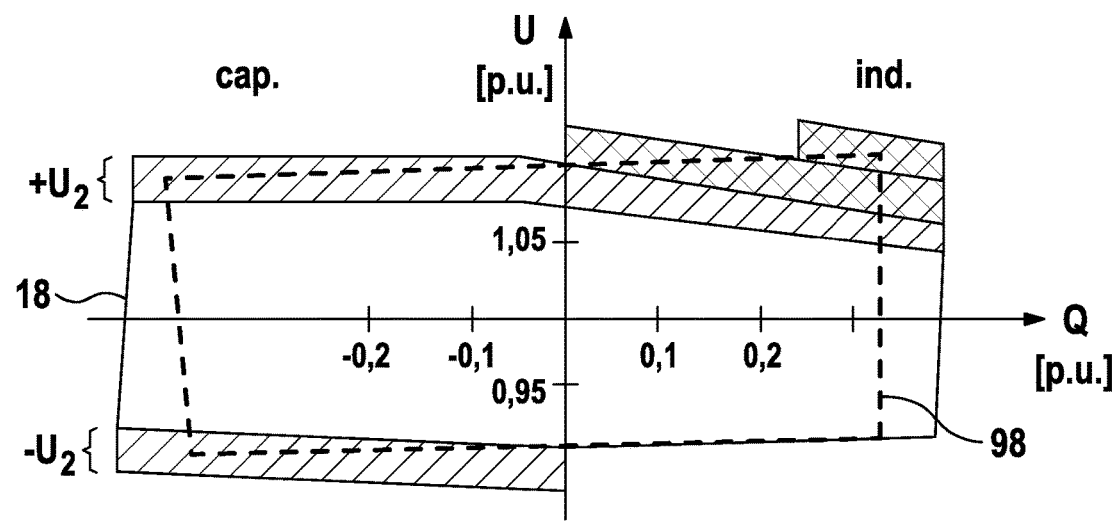
FIG. 11 shows a characteristic curve graph for the operation of the wind turbine using the voltage modulator according to the invention.

The effect of the voltage expander according to the invention is illustrated in FIG. 11. Said figure shows an example of a requirement spectrum defined by a grid operator, namely for the output of for what capacitive or inductive wattless power in what voltage range the wind turbine needs to be competent (illustrated by a thick dashed line 98). The wattless power is plotted on the x axis and the voltage range required for the respective wattless power is plotted on the y axis. In comparison with this requirement by the grid operator, an operating range 18 of the wind turbine 1 in accordance with the exemplary embodiment of the invention is illustrated (with a continuous line). It can be seen that the operating range 18 bounded by the continuous line does not completely cover the requirement range defined by the dashed line 98. This means that the wind turbine 1 is insufficient in its initial form for meeting the requirements as are established by the dashed region 98. Thus, the low-voltage range in the left-hand lower quadrant cannot be sufficiently adhered to and in addition the high-voltage range is not sufficiently covered both for capacitive and for inductive wattless power.

If the wind turbine 1 is operated in the left-hand lower quadrant, for example, i.e. at a low voltage and at the requirement for capacitive wattless power, the voltage expander 3 is connected by means of the MINUS tap-changing operation. Thus, the voltage of the wind turbine is reduced by the (for this case negative) voltage U2 applied by the voltage expander, as a result of which the lower voltage limit is shifted downwards by the hatched region. It can be seen that the wind turbine 1 can therefore maintain the required low-voltage range.

This likewise applies to the capacitive range in the high-voltage range (see left-hand upper quadrant). In this case too, the wind turbine 1 cannot generate the required overvoltage in the case of a request for capacitive wattless power (the dashed line in accordance with the requirements 98 is above the native operating range 18 of the wind turbine 1). In accordance with the invention, if required the voltage expander 3 is switched by means of the switching mechanism 33 into the PLUS position in this quadrant, with the result that the additional voltage U2 (in this case positive), is added. The voltage range therefore shifts correspondingly upwards, as is demonstrated by the hatched region in the left-hand upper quadrant.

A corresponding procedure is followed in the right-hand upper quadrant. It can be seen, however, that the addition of a tap, as is illustrated by the region with angled hatching, is insufficient for meeting the requirements illustrated by the thick dashed line 98. In this case, the multi-tap nature in accordance with the invention comes into play in the sense that additional taps are enabled. In this case, the additional voltage increases correspondingly, with the result that the voltage range of the wind turbine is expanded upwards to such an extent that the requirements are finally met (see the cross-hatched region) by virtue of the connection of two or, in the case of a greater requirement for inductive wattless power, even by the addition of three taps.

Figure 12:
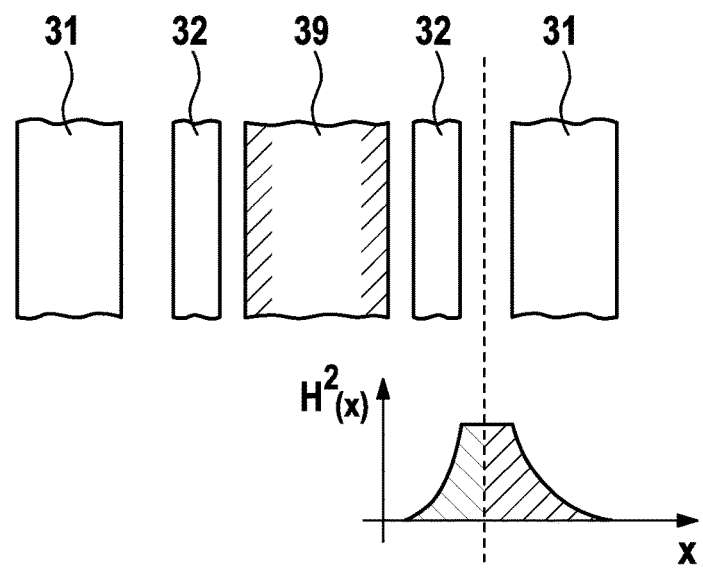
FIG. 12 shows a detail illustration of a high-leakage-reactance transformer.

FIG. 12 shows a detailed illustration of a high-leakage-reactance transformer as a possible embodiment of the small transformer 30. The high-leakage-reactance transformer comprises a core 39 composed of magnetic steel sheets with a hard saturation characteristic, with first a secondary winding 32 being wound onto said core, and in turn then a primary winding 31 being wound onto said secondary winding. The magnetization profile resulting in the process and the energy stored in the magnetic field between the secondary coil 32 and the primary coil 31 are illustrated schematically in the graph in the lower half of the figure. Therefore, current limitation is effected in the event of a short circuit, to be precise in particular in respect of the switching mechanism. It goes without saying that this can also be achieved with other designs.

The invention claimed is:

1. A wind turbine comprising a wind rotor, a generator driven thereby for generating electrical energy, a connecting line for outputting the electrical energy to a grid, and a voltage expander configured to expand the voltage range of the wind turbine using an additional voltage source, wherein the voltage expander comprises a dedicated small transformer that is rated at a fraction of a rated power of the wind turbine, the small transformer comprising a primary winding, a secondary winding, and a switching mechanism, and wherein the small transformer is looped in the connecting line with the secondary winding, the switching mechanism is connected to the primary winding of the small transformer and actuates the primary winding with the capacity for switchover in multi-tap actuation fashion, and the switching mechanism is supplied, via a connection, with a voltage that is matched with respect to frequency and phase angle to a voltage of the grid.

2. The wind turbine of claim 1, wherein the multi-tap actuation by the switching mechanism takes place with different polarization.

3. The wind turbine of claim 1, wherein a plurality of small transformers are arranged in series on the connecting line.

4. The wind turbine of claim 3, wherein a dedicated switching mechanism is provided for each of the plurality of small transformers.

5. The wind turbine of claim 1, wherein the small transformer has a power which is at most ¼ of the rated power of the wind turbine.

6. The wind turbine of claim 5, wherein the power of the small transformer is dimensioned such that the power is proportional to the additional voltage.

7. The wind turbine of claim 6, wherein the power of the small transformer is at most a tenth of the rated power of the wind turbine in the case of an additional voltage of the order of a tenth of the rated voltage.

8. The wind turbine of claim 1, wherein the voltage expander is disconnectable from the connecting line via switching contactors.

9. The wind turbine of claim 1, wherein the switching mechanism has a load tap, which is connected during switchover so that the small transformer is always connected to a load.

10. The wind turbine of claim 1, wherein the voltage expander is connected on a high-voltage side to a turbine transformer.

11. The wind turbine of claim 10, wherein the small transformer is connected within a medium-voltage winding of the turbine transformer.

12. The wind turbine of claim 11, wherein the small transformer is in the form of a high-leakage-reactance transformer, which has a short-circuit voltage uk of at least 0.10.

13. The wind turbine of claim 12, wherein the high-leakage-reactance transformer has magnetic steel sheets with a hard saturation characteristic.

14. The wind turbine of claim 12, wherein the primary winding of the small transformer is wound over the secondary winding thereof.

15. The wind turbine of claim 12, wherein the high-leakage-reactance transformer is provided with pancake coils.

16. The wind turbine of claim 15, wherein the pancake coils are arranged on remote limbs of a transformer core and are in the form of webs in the transformer core.

17. The wind turbine of claim 15, wherein the pancake coils are arranged on remote limbs of a transformer core or are in the form of webs in the transformer core.

18. The wind turbine of claim 11, wherein the small transformer is in the form of a high-leakage-reactance transformer, which has a short-circuit voltage uk of at least 0.15.

19. The wind turbine of claim 10, wherein the voltage expander is connected within a medium-voltage winding of the turbine transformer.

20. The wind turbine of claim 10, wherein the small transformer is connected on a medium-voltage side at a neutral point of the turbine transformer.

21. The wind turbine of claim 1, wherein the switching mechanism is actuated depending on at least one of voltage and wattless power.

22. The wind turbine of claim 21, comprising a regulator for the at least one of voltage and wattless power, wherein the regulator is configured to detect, as controlled variable, the at least one of voltage and wattless power in the connecting line.

23. The wind turbine of claim 22, wherein the voltage expander interacts with disturbance variable feedforward control for the regulator.

24. The wind turbine of claim 22, wherein the regulator is configured to detect, as controlled variable, the at least one of voltage and wattless power in the connecting line on the side of the voltage expander which is remote from the wind turbine.

25. A wind farm comprising a plurality of wind turbines connected to a farm grid that is connected to a transmission grid via a coupling line, and a central voltage expander configured to expand the voltage range of the wind farm using an additional voltage source, wherein the additional voltage source comprises a small transformer that is rated at a fraction of a rated power of a wind turbine of the plurality of wind turbines, the small transformer comprising a primary winding, a secondary winding, and a switching mechanism, and wherein the small transformer is looped in the coupling line with the secondary winding, the switching mechanism is connected to the primary winding of the small transformer and actuates the primary winding with the capacity for switchover in multi-tap actuation fashion, wherein the switching mechanism is supplied, via a connection, with a voltage that is matched with respect to frequency and phase angle to a voltage of the farm grid.

26. The wind farm of claim 25, comprising a farm regulator for at least one of voltage and wattless power, wherein the farm regulator is configured to detect, as controlled variable, the at least one of voltage and wattless power in the coupling line.

27. The wind farm of claim 26, wherein the voltage expander interacts with disturbance variable feedforward control for a farm regulator.

28. The wind farm of claim 26, wherein the farm regulator is configured to detect, as controlled variable, the at least one of voltage and wattless power in the coupling line on the side of the voltage expander which is remote from the farm.

* * * * *